April 21, 1970   P. U. PUTSCH ET AL   3,507,539
VEHICLE SEAT

Filed July 31, 1968   3 Sheets-Sheet 1

INVENTORS
Peter Ulrich Putsch
Friedrich Wilhelm Putsch by Michael J. Striker

April 21, 1970   P. U. PUTSCH ET AL   3,507,539
VEHICLE SEAT
Filed July 31, 1968   3 Sheets-Sheet 2
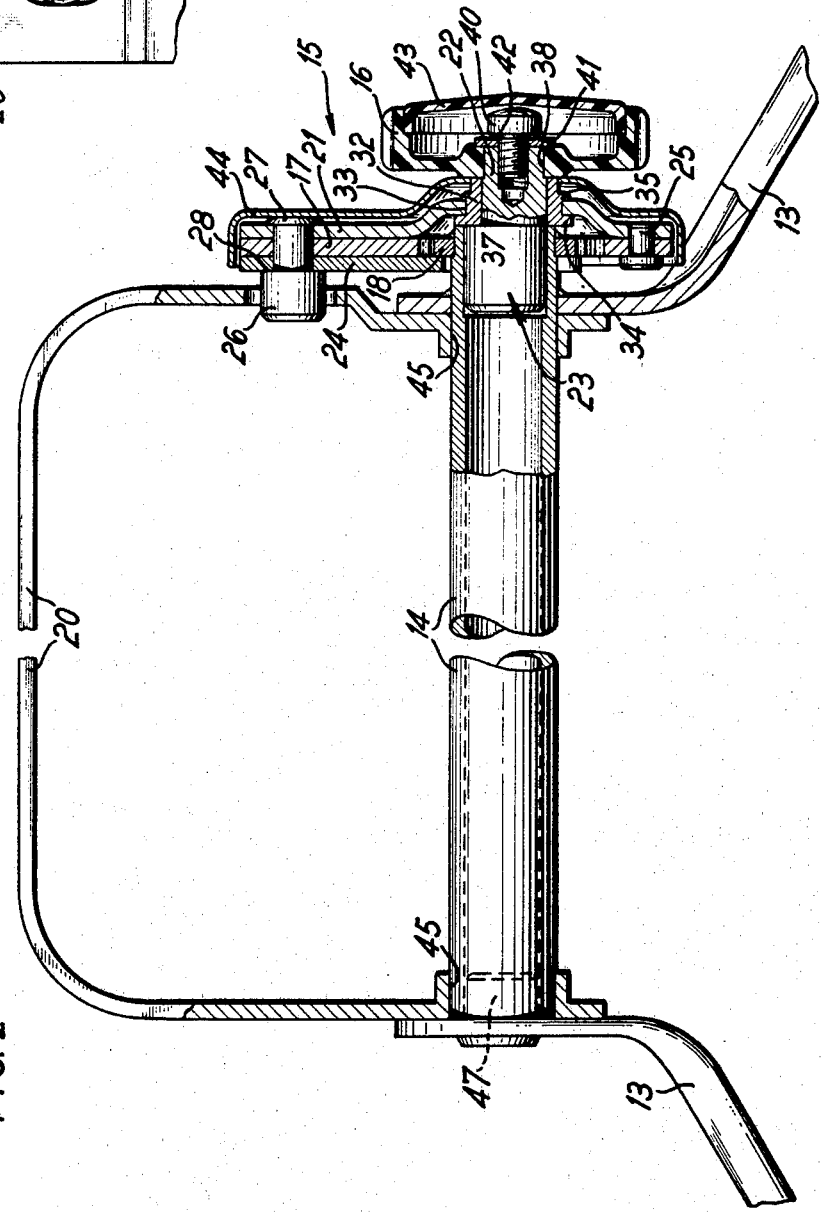

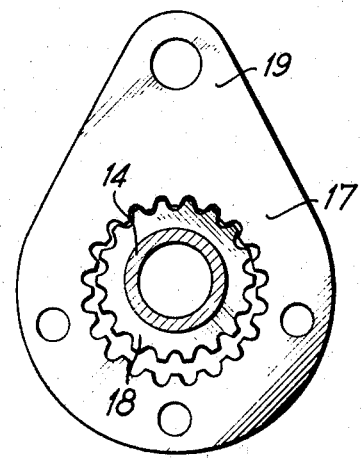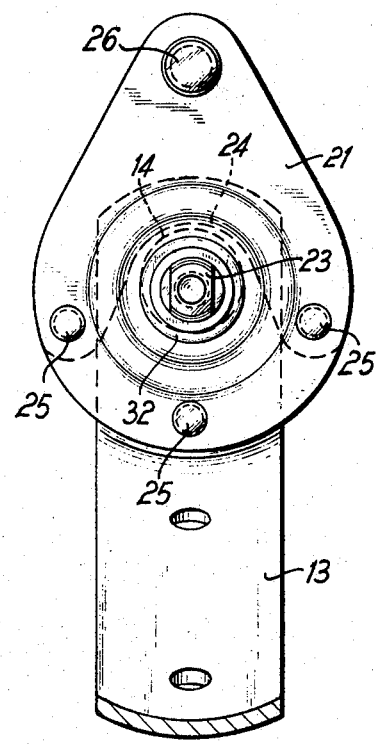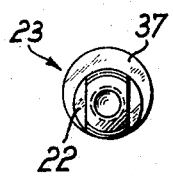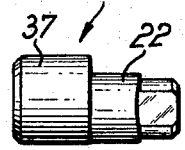

United States Patent Office 3,507,539
Patented Apr. 21, 1970

3,507,539
VEHICLE SEAT
Peter Ulrich Putsch, Manweiler, Pfalz, and Friedrich Wilhelm Putsch, Remscheid, Germany, assignors to Fritz Keiper, Remscheid-Hasten, Germany
Filed July 31, 1968, Ser. No. 749,043
Claims priority, application Germany, Jan. 20, 1968, K 64,506
Int. Cl. A47c 7/36
U.S. Cl. 297—410          12 Claims

ABSTRACT OF THE DISCLOSURE

A vehicle seat comprises a backrest member having an upper edge. A headrest member is arranged adjacent the upper edge. Mounting means mounts the headrest member for angular displacement with reference to the backrest member and includes a shaft defining a pivot axis for the headrest member, a ring gear fixed with the backrest member and a spur gear fixed with the headrest member and cooperating with the ring gear, the spur gear having an outer diameter which is smaller than the rude diameter of the ring gear by a distance corresponding at least to the height of one tooth. An eccentric is turnably carried by the shaft and includes an eccentric portion whose eccentricity is substantially equal to the difference between the outer diameter and the root diameter and is so selected as to assure self-locking of the gears.

BACKGROUND OF THE INVENTION

The present invention relates to a seat in general, and more particularly to a vehicle seat. Still more specifically the invention relates to a seat for automotive vehicles.

For various reasons, including the comfort of the passengers and in order to minimize the danger of neck injuries resulting from the whiplash effect in case of rear end collisions it is known to provide seats in automotive vehicles with headrest members which are located upwardly adjacent the upper edge of the backrest member of the seat. To make these headrest members truly comfortable for the user they are usually adjustable, including angular displaceability with respect to the backrest member. In known arrangements of this type, including one which utilizes a self-locking screw spindle which is arranged rearwardly of the headrest member, the adjusting mechanism cannot be located within the body of the headrest member or else in such a manner as not to be clearly visible and as not to take up too much space. This is of course disadvantageous, as is the fact that all the known arrangements of this type are relatively difficult to adjust. This latter fact is particularly objectionable if, as is frequently the case, it prevents adjustment of the headrest member while the vehicle is in motion because the adjusting arrangement cannot be properly reached by the passenger without leaving his seat or radically changing his position. Finally, there is the additional disadvantage that in arrangements of this type wherein the adjusting mechanism is located exteriorly of the headrest member, there is always the danger of injury by this mechanism to passengers who are riding in seats behind those equipped with the headrest members.

It is therefore a general object of the present invention to overcome the disadvantages outlined above.

A more particular object of the invention is to provide an arrangement of the type hereunder discussion wherein the adjusting mechanism is no longer disposed in such a manner as to constitute a possible danger to passengers in a vehicle provided with the arrangement, and also so as to require a minimum of space.

An additional object of the invention is to provide such an arrangement which can be simply and readily operated.

A further object of the invention is to provide an arrangement of the type under discussion which is simple in its construction and therefore inexpensive to manufacture and to sell.

SUMMARY OF THE INVENTION

In accordance with one feature of my invention I provide a seat, particularly a seat for automotive vehicles, which comprises a backrest member having an upper edge, and a headrest member which is arranged adjacent the upper edge of the backrest member. Mounting means is associated with the aforementioned members and mounts the headrest member on the backrest member with freedom of angular adjustment relative thereto. The mounting means includes pivot means associated with the members, a ring gear provided on one of the members and having inwardly directed teeth, a spur gear provided on the other of the members received within the ring gear and meshing with the teeth thereof, the spur gear having an outer diameter which is smaller than the root diameter of the ring gear by a distance corresponding at least to the height of one tooth, and eccentric means turnably carried by the pivot means and including an eccentric portion whose eccentricity is substantially equal to the difference between the outer diameter and the root diameter and which is so selected as to assure self-locking of the gears. Actuating means is operatively associated with the eccentric means for enabling turning of the same with reference to the pivot means.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 2 is a front view, partly sectioned and with the covering upholstery material removed, of the embodiment shown in FIG. 1;

FIG. 3 is a detail view, on an enlarged scale, illustrating a detail of FIG. 2 as seen in a side view thereof;

FIG. 4 is a further detail view of FIG. 2, again illustrating a detail as seen in a side view of FIG. 2;

FIG. 5 is a plan view of the gear arrangement employed in the embodiment of FIG. 2;

FIG. 6 is an end view of an eccentric employed in the embodiment of FIG. 2; and

FIG. 7 is a side view of the eccentric shown in FIG. 6.

DESCRIPTION OF THE PREFERRED EMBODIMENTS

Figure 1:
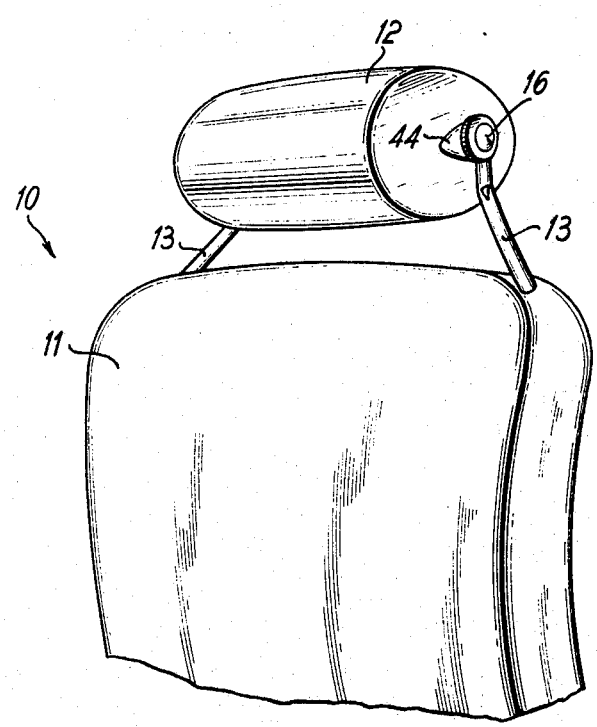
FIG. 1 is a partial and diagrammatic view illustrating a seat and head rest member embodying the present invention.

Discussing now the drawing in detail it is pointed out that all those components of the seat which are not necessary for an understanding of the invention, have been omitted in the drawing for the sake of clarity.

In FIG. 1 I have illustrated a vehicle seat 10 of which only the upper portion of the back rest member 11 is shown. The lower portion of the back rest member and the seat portion of the seat have been omitted as not essential for an understanding of the invention. A head rest member 12 is located above and in the region of the upper edge of the back rest member 11 to which it is secured in the illustrated embodiment by two arms 13 constituting support means which is connected on the one hand with the inner frame of the back rest member 11 and on the other hand with the means defining a pivot axis for the head rest member 12. Both the inner frame and this means are to be discussed in detail subsequently.

While in FIG. 1 the cross-section of the head rest member 12 is shown to be substantially egg-shaped with the blunter side facing towards in the illustrated position of adjustment of the head rest member 12, it will be appreciated that the cross-sectional configuration of the member 12 may of course be varied as desired. In the illustrated embodiment the pivot axis, which soon will be discussed in detail, is located eccentrically, that is towards the rear of the central axis of the member 12, so that only a relatively small tilting movement of the member 12 is required to present to the head of a passenger sitting on the seat 10 a different support area.

Coming now to FIG. 2 it will be seen that here the embodiment of FIG. 1 is illustrated in partial section, and with all upholstery material removed so that the various frames and other components are more clearly visible. The pivot axis is constituted by a shaft member 14 which in the illustrated embodiment is tubular, but which may be solid or of other configuration. An actuating means is provided in form of a turnable handle 18 which actuates the control arrangement by means of which turning of the head rest member 12 about the pivot axis 14 may be initiated and prevented. This control arrangement is generally identified with reference numeral 15 and includes a ring gear 17 having inwardly facing teeth, and a spur gear 18. In accordance with the invention the outer diameter of the spur gear 18 is smaller by at least the height of one tooth than the root diameter of the ring gear 17. Furthermore, there is a difference of at least one in the number of teeth on one of the gears as compared to the other gear.

In the illustrated embodiment the spur gear 18 is mounted coaxially on the shaft 14 with which it is non-rotatably connected, for instance by welding as illustrated, although any other suitable means for achieving non-rotatable connection will be satisfactory. To achieve foolproof positioning of the spur gear 18 in predetermined axial position on the shaft member 14, and to thereby facilitate quick and effortless assembly of the device, the shaft member 14 is provided at its right-hand end with a flat facet (visible in FIG. 2 but not separately identified with a reference numeral) or with an annular shoulder or similar means against which the spur gear 18 will abut when the latter is pushed onto the shaft member 14. The ring gear 17 is of generally circular outline except for a lateral extension 19. The overall outline of the ring gear 17 and of the extention 19 is more clearly visible in FIG. 5.

FIG. 2 shows that a supporting plate 21 is secured to the ring gear 17 whose outline it shares and against which it abuts at the axially outer side of the arrangement 15. A bifurcated member 24, whose outlines correspond substantially to those of the support plate 21 and the ring gear 17, abuts against the ring gear 17 on that side thereof which faces away from the supporting plate 21. The construction of the bifurcated member 24 is such that, when the device is assembled in the manner shown in FIG. 2, the legs of the member 24 will engage portions of the spur gear 18.

One or more rivets 25 secure the ring gear 17 in its predetermined position between the supporting plate 21 and the bifurcated member 24, and a bolt 26 passes through the extension 19 for the same purpose, namely to prevent rotation of the members 17, 21 and 24 with reference to one another. FIG. 2 shows that the bolt 26 comprises a portion of reduced diameter which extends through the bifurcated member 24, the extension 19 of the ring gear 17 and the supporting plate 21. A head 27 abuts against the plate 21 as shown in FIG. 2. A shoulder 28 exists at the juncture between the larger-diameter and the reduced-diameter portions of the bolt 26 and abuts the outer side of the bifurcated member 24. FIG. 2 and the detail view in FIG. 3 both show that the substantially U-shaped supporting frame 20 of the head rest member 12, that is the frame which is normally concealed within the upholstery material of the head rest member, is provided with an elongated slot-shaped opening 31 in which the larger-diameter portion of the bolt 26 is received.

As FIG. 2 shows, the supporting plate 21 serves as a bearing for an eccentric 22. For this purpose the plate 21 is provided with a sleeve bearing 32 which is so mounted on the plate 21 as to extend through an opening 33 thereof which is concentric with the gear teeth on the ring gear 17. In the illustrated embodiment a portion of the supporting plate 21, namely the portion surrounding the opening 33 in plate 21, is bent upwardly as seen in FIG. 1 and in axial direction of the shaft 14 away from the ring gear 17. The marginal portion of the supporting plate 21 bounding the opening 33 therein is in suitable manner clamped against rotation between shoulders 34 and 35 provided on the sleeve bearing 32. The bolt-shaped member 23 provided with the eccentric portion 22 is shown in more detail in FIGS. 6 and 7. The eccentric portion 22 is journalled in the sleeve bearing 32 and shifting of the latter with reference to the eccentric portion 22 is precluded because the sleeve bearing abuts with one end against the end face of the shaft 14 whereas the bifurcated member 24 provides movement of the supporting plate 21, with which the sleeve bearing 32 is rigid, in direction away from the end face of shaft 14. The bolt-shaped member 32 is provided not only with the eccentric portion 22, as clearly shown in FIGS. 6 and 7, but also with a second portion 32 of circular cross-section whose diameter is larger than that of the eccentric portion 22. FIG. 6 shows that the cross-section of the eccentric portion 22 is itself circular but that this portion is located eccentrically with reference to the portion 37. The latter is received, as seen in FIG. 2, in the end of the tubular shaft 14. In the illustrated embodiment the diameter of the portion 37 is such that the inner diameter of the tubular shaft 14 in the area where the portion 37 is to be introduced into the latter, is made somewhat larger than the inner diameter of the remainder of the tubular shaft 14. This construction is advantageous because the resulting shoulder in the interior of the tubular shaft 14 serves as a limit stop for limiting the extent to which the member 23 can be inserted into the interior of the tubular shaft 14, thereby again facilitating proper and quick assembly of the components involved.

As mentioned before, actuating means in form of a handle member 16 is provided. This actuating means is connected with an extension of the eccentric portion 22 of the bolt-shaped member 23. This extension is provided in known manner with one or more flat facets (compare FIG. 6) so as to prevent rotation of the handle member 16 with reference to the bolt-shaped member 23 when the extension of the latter is received in an aperture 38, here a centrally located aperture, of the handle member 16. The aperture 36 of course has a cross-sectional configuration corresponding to that of the extension of the eccentric portion 22. A screw or bolt 40 is threaded into a tapped bore (diagrammatically shown in FIG. 6) of the extension of the eccentric portion 22, and a ring gasket 41 and a spring ring 42 are interposed between the head of the screw 40 and the opening 38 of the member 16. In the illustrated embodiment the member 16 is hollow and of substantially cup-shaped cross-section. A cover or cap 43 is provided which closes the open side of the member 16 so that the head of the screw 40 and the associated components are not visible.

For similarly protective as well as aesthetic reasons, a cover member 44 is provided which surrounds the exposed axial side of the device 15. More specifically, it surrounds the supporting plate 21, the ring gear 17 and the bifurcated member 24. For this purpose the cover member 44 is non-rotatably secured on the sleeve bearing 32 and the outline of the cover member 44 corresponds substantially to the outline of the supporting plate 21 and the ring gear 17 with the inner diameter of the cover member 44 being just sufficiently large so that these members can be received within the cover member 44.

FIG. 2 shows also that the supporting frame 20 of the head rest member 12 is provided with openings which are surrounded with flange-shaped inwardly directed collars 45 through which the shaft member 14 extends so that the frame member 20 is turnably mounted thereon. The shaft member 14 further extends through an opening in the right-hand supporting arm 13 (which is connected with the non-illustrated frame of the back rest member 11) and it is welded or otherwise suitably non-rotatably secured to this right-hand supporting arm 13, as already pointed out earlier. The left-hand supporting arm 13 is provided with an inwardly facing pin or projecting portion 47 which extends into the open end of the shaft member 14. Evidently, the shaft member 14 need not be tubular, as here illustrated, but could be solid and be provided with axial recesses at its opposite ends to accommodate the various components described and illustrated herebefore. The supporting arms 13 diverge outwardly away from one another, as shown in FIG. 2, because in the illustrated embodiment the axial length of the head rest member 12 (compare also FIG. 1) is smaller than the width of the back rest member 11.

The eccentricity of the eccentric portion 22 is so selected that in any position of the ring gear 17 with reference to the spur gear 18 the arrangement will be self-locking, thereby eliminating the need for separate means for locking the head rest member 12 against further turning with respect to the back rest member 11.

To effect turning of the head rest member 11 to desired position, that is its angular rotation with respect to the back rest member 11 about the shaft 14, it is simply necessary to turn the handle member 16 in the desired direction, that is either to the left or to the right. This results in simultaneous turning of the bolt-shaped member 23 with the eccentric portion 22, and this in turn effects movement of the ring gear 17 in an eccentric path. During such movement the inwardly projecting teeth of the ring gear 17, which ride on only some of the teeth of the spur gear 18 at any given time, mesh with those teeth. The movement of the ring gear 17 is transmitted to the frame member 20 via the bolt 26 and results in a turning movement of the head rest member 12 because, owing to the elongated slot-shaped configuration of the aperture 31 in the frame member 20, and owing to the fact that the direction of elongation of this aperture 31 is longitudinally of the arms of the frame member 20, the movement of the ring gear 17 a longitudinal direction of these arms is not transmitted because the larger-diameter portion of the bolt 26 slides in the aperture 31.

It will be appreciated that the illustrated embodiment is only exemplary of the possibilities inherent in the invention. Evidently, it is possible to connect the head rest member 12 with the back rest member 11 in ways other than the exemplary manner illustrated in the drawing. For instance, a single supporting arm could be used which would centrally engage the shaft 14. Again, in place of the one-piece shaft 14 it is possible to use shaft sections connected for instance to the arms 13 and on which the frame member 20 is turnably mounted. Obviously, the configuration of the frame member 20 may be different from what is shown, just as it has already been pointed out that the cross-sectional and other configuration of the head rest member 12 may be different from what has been illustrated. Of course, if the cross-sectional configuration of the head rest member 12 should be circular, it would be necessary to assure that the pivot axis be off-center with respect to the central axis of the member 12 to obtain the desired effect. Furthermore, it is possible to provide the illustrated arrangement 15 not only at one axial end of the member 12, but at both axial ends, and to provide a single handle member for controlling both arrangements simultaneously, or to provide two handle members for controlling both arrangements individually.

It will be understood that each of the elements described above, or two or more together, may also find a useful application in other types of constructions differing from the types described above.

While the invention has been illustrated and described as embodied in a vehicle seat, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that from the standpoint of prior art fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

1. A seat, particularly for automotive vehicles, comprising in combination, a back rest member having an upper edge; a head rest member arranged adjacent said supper edge of said back rest member; mounting means associated with said members mounting said head rest member on said back rest member with freedom of angular adjustment relative thereto, said mounting means including pivot means associated with said members, a ring gear provided on one of said members and having inwardly directed teeth, a spur gear provided on the other of said members received within said ring gear and meshing with said teeth thereof, said spur gear having an outer diameter which is smaller than the root diameter of said ring gear by a distance corresponding at least to the height of one tooth, and eccentric means turnably carried by said pivot means and including an eccentric portion whose eccentricity is substantially equal to the difference between said outer diameter and said root diameter and is so selected as to assure self-locking of said gears; and actuating means operatively associated with said eccentric means for enabling turning of the same with reference to said pivot means.

2. A seat as defined in claim 1, wherein said mounting means comprises supports connecting said pivot means with said back rest member, said spur gear being fixedly mounted on said pivot means and said ring gear being fixedly mounted on said head rest member for rotation therewith.

3. A seat as defined in claim 2, said ring gear comprising a lateral projection and a follower extending from said projection; and wherein said mounting means comprises a holding element carried by said pivot means turnable thereon and connected with said head rest member, said holding element being provided with a slot-shaped opening and said follower projecting into said opening.

4. A seat as defined in claim 2, said eccentric means including a plate member, connecting means provided on said plate member connecting the same to said ring gear, and a bolt member carried by said plate member and provided with said eccentric portion.

5. A seat as defined in claim 4, said plate member including a sleeve bearing for said bolt member, said sleeve bearing being carried by said plate member non-rotatably relative thereto and having an axial end, said pivot means having a radial shoulder and said axial end of said sleeve bearing abutting against said shoulder.

6. A seat as defined in claim 2, and further comprising blocking means blocking undesired separation of said gears and including a fork member secured to said ring gear and including legs which embrace said pivot means and engage said spur gear in a sense preventing withdrawal thereof from meshing engagement with said ring gear.

7. A seat as defined in claim 2, said support means comprising a pair of arms connected with said back rest member, one of said arms engaging one end of said pivot means in the region of said gears, said pivot means being provided with a bore and the other of said arms being provided with a pin extending into said bore at the other end of said pivot means spaced from said gears.

8. A seat as defined in claim 7, wherein said pivot means is of tubular configuration.

9. A seat as defined in claim 3, wherein said holding element is of substantially U-shaped configuration and comprises a pair of arms, and bearing means provided in the respective arms with said pivot means being journalled in said bearing means.

10. A seat as defined in claim 9, wherein said pivot means comprises a shaft consisting of two axially aligned sections respectively journalled in said bearing means.

11. A seat as defined in claim 5, and further comprising a cover rigid with said sleeve bearing and covering said gears.

12. A seat as defined in claim 11, wherein said cover is constructed and arranged so that said actuating means is unobstructed and accessible.

References Cited

UNITED STATES PATENTS

| | | | |
|---|---|---|---|
| 2,740,467 | 4/1956 | Page | 297—410 X |
| 3,092,394 | 6/1963 | Burke | 297—410 X |
| 3,205,005 | 9/1965 | Brown | 297—410 X |
| 3,307,874 | 3/1967 | Wilson | 297—410 |
| 3,186,763 | 6/1965 | Ferrara | 297—408 |

NILE C. BYERS, JR., Primary Examiner